Feb. 21, 1956  A. E. LOCKWOOD  2,735,571
FILLER CAP ASSEMBLY
Filed Dec. 31, 1952
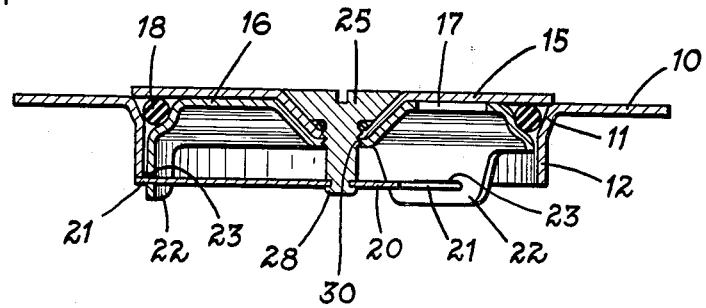
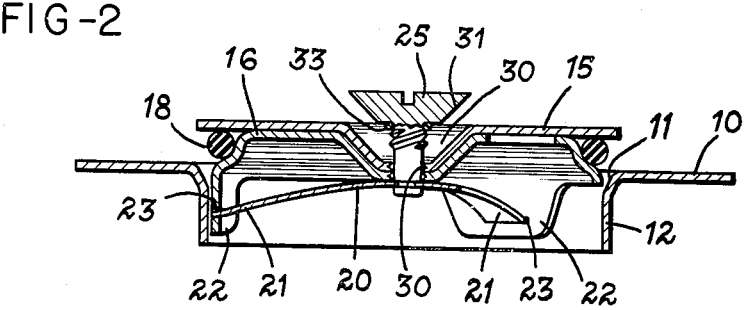
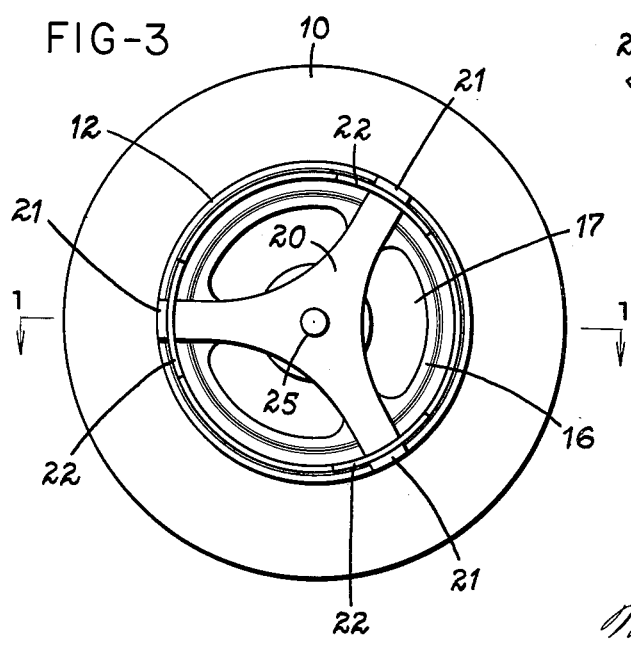
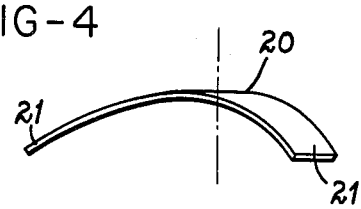
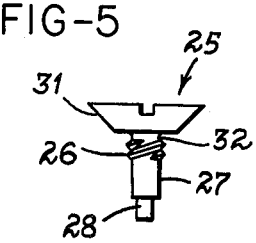
*INVENTOR.*
ARTHUR E. LOCKWOOD
BY
Marechal Biebel French & Bugg
ATTORNEYS

United States Patent Office 2,735,571
Patented Feb. 21, 1956

2,735,571
FILLER CAP ASSEMBLY

Arthur E. Lockwood, Springfield, Ohio, assignor to The Steel Products Engineering Company, Springfield, Ohio, a corporation of Ohio Application December 31, 1952, Serial No. 328,877

2 Claims. (Cl. 220—25)

This invention relates to a filler cap assembly, and it has particular relation to filler cap assemblies adapted for use with fuel tanks and other containers wherein the interior of the container is under pressure, such for example as in the case of fuel tanks for airplanes.

One of the principal objects of the invention is to provide a filler cap assembly of the above type for the inlet of a container which is of very simple design and lightweight construction comprising a minimum number of parts, which can be quickly applied and removed with minimum effort and without requiring special tools, and which will not only seal against internal pressure but will also seal against icing-over conditions capable otherwise of interfering with removal of the cap.

An additional object of the invention is to provide such a filler cap assembly which will present a substantially flush surface in closed position and is therefore particularly adapted for mounting on an exposed surface portion of an airplane, and which at the same time is capable of construction at sufficiently low cost to warrant its use on disposable fuel tanks for aircraft.

It is also an object of the invention to provide a filler cap assembly of the above type in which a single spring member provides a biasing action tending to hold the closure in closed position and also includes the parts which interlock with the inlet portion of the container to maintain the assembly in its closed position.

Other objects and advantages of the invention will be apparent from the following description, the accompanying drawing and the appended claims.

In the drawing—

Fig. 1 is a sectional view of a filler cap assembly constructed in accordance with the invention and shown in closed position, the view being approximately on the line 1—1 of Fig. 3;

Fig. 2 is a view similar to Fig. 1 showing the filler cap assembly in released position ready for opening;

Fig. 3 is a bottom plan view of the filler cap assembly in closed position;

Fig. 4 is a detail view of the locking spring member of the assembly; and

Fig. 5 is a detail view of the operating screw of the assembly.

Referring to the drawing, which illustrates a preferred embodiment of the invention, the adapter includes a peripheral flange portion 10 adapted to be riveted or otherwise secured to a container such as a fuel tank of airplane or other vehicle. A tapered annular rim 11 on the adapter surrounds the filling opening formed by an inner cylindrical flange 12, and the cooperating cap or closure includes a cover 15 proportioned to overlie the tapered rim 11. A shell 16 is welded or otherwise secured to the cover 15 and is proportioned to extend freely within the cylindrical flange 12 and the main body of this shell is cut out at 17 to save stock and weight. An O-ring 18 lies in the peripheral groove formed by cover 15 and shell 16 for sealing against the rim 11 in the closed position of the assembly.

The main locking member of this assembly is a leaf spring 20 having multiple arms 21 radiating from its central portion. The spring 20 is of bowed shape in its normal or unstressed position as shown in Fig. 4, satisfactory results having been obtained with this spring having a normal position substantially conforming with the corresponding portion of a sphere. The shell 16 includes cylindrically curved tongue portions 22 which extend axially within the flange portion 12 of the adapter, and these tongues are slotted at 23 to receive the ends of the arms 21 on the spring. These parts are so proportioned that in the normal outwardly bowed condition of the spring, the arms 21 retract within the slots 23 so that the closure unit can be moved in and out of the adapter, but when the spring is deflected to substantially flat shape, the ends of the arms 21 project radially beyond the shell tongues 22 and into overlapping and thus interlocking relation with the inner end of the flange 12 as shown in Fig. 1.

The spring 20 is operated by means of a screw 25 of special construction including a threaded outer portion 26 and a non-threaded inner portion 27 terminating in an end portion 28 which is riveted or peened to the center of the spring 20. The cover 15 and shell 16 have a passage 30 therethrough which is tapped to receive the threaded portion 26 of screw 25, while the non-threaded screw portion 27 is freely slidable therethrough. The central portions of the cover and shell are conically embossed to receive the tapered head 31 of screw 25 therein so that its upper end is flush with the surrounding surface of the cover. In addition the screw 25 is relieved at 32 between its threaded portion 26 and head 31 to receive an O-ring 33 which acts in the closed position of the assembly to seal the upper end of passage 30 against both access of moisture from without and escape of pressure from within.

Fig. 2 shows this assembly in released position, and it will be noted that with the screw 25 unthreaded until the threads thereon are above passage 30, the natural action of spring 20 will cause it to bow upwardly and thus to raise screw 25 to its uppermost position by sliding its portion 27 in passage 30. With the parts in this position, the ends of the spring arms 21 lie within the slots 23 in tongues 22 but inwardly of the flange 12 so that the unit can be readily removed from or inserted in the adapter.

To close the container opening, the cap assembly is inserted into the adapter as shown in Fig. 2 and pressed downwardly until the cover 15 is touching the top surface of the adapter flange 10. A suitable tool such as a screw driver or large coin is then inserted in the slotted head of screw 25, and the screw is forced downwardly until the threads thereon are in position to engage the tapped passage 30. In this position of the parts, the spring 20 is sufficiently deflected towards flatness for the ends of the arms 21 to begin engagement with the lower rim of flange 12. The screw 25 is then threaded into the passage 30 until its conical head portion engages the depression in the cover as shown in Fig. 1, and in this position the spring 20 is effectively flat to complete the projection of its arms 21 into overlapping and interlocked relation with the flange 12.

Fig. 1 shows the cap assembly in this closed position, and it will be noted that while it is the projecting ends of the spring arms 21 which provide the effective lock for the cap assembly within the adapter, the ends of these arms are closely supported by the tongues 22 so that stresses tending to force the cap open as a result of pressure within the container are concentrated in direct shear at points closely adjacent the slots rather than intending to bend the entire area of the spring. This results in a strong and effective lock capable of resisting relatively high pressures within the container without damage to the assembly. At the same time, with the ring 18 sealing on the rim 11 as shown, both escape of pressure from within the container and leakage of moisture from outside the container through the space between the closure and the adapter are effectively prevented, and the ring 33 provides a similar two-way seal at the upper end of the passage 30.

It will accordingly be seen that this filler cap assembly is very simple to use, requiring as it does no special tools for either removal or replacement. When the unit is to be opened, it is merely necessary to unscrew the screw 25 until its threaded portion is out of engagement with the threaded passage 30, which is readily done with a coin or suitable tool such as a screw driver, and then the natural force of the spring 20 in returning to its normal bowed shape will both raise the screw to its uppermost position and at the same time release the spring ends 21 from their locked engagement with flange 12. In addition, this filler cap assembly offers advantages of economical production, and the component parts thereof are individually so simple to produce and assemble that these units can be made at sufficiently low cost to warrant their use on disposable fuel tanks and other containers.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A filler cap assembly for the inlet of a container to retain positive pressure on the contents thereof, comprising an adapter including an annular rim and a cylindrical flange extending from said rim and forming the inlet opening, a cover proportioned to seat on said rim, gasket means carried by said cover for sealing against said rim in the closed position of said cover, an insert member carried by said cover and receivable within said flange, a multi-armed leaf spring carried by said insert member and being in the unstressed condition thereof generally spherically bowed outwardly toward said cover, said insert member having radial slots therethrough receiving said spring arms therethrough in guided relation, said spring being proportioned in said unstressed condition to retain the ends of said arms within said slots and said inlet opening for free insertion of said insert member into said flange, said cover having a recess in the central portion thereof, a screw threaded through said cover and including a head adapted to be received within said recess in flush relation with the surrounding portion of said cover, means connecting the inner end of said screw with said spring to cause flattening of said spring upon inward threaded movement of said screw with resulting projection of said arms into overlapping and locked relation with said flange, the portions of said insert member having said slots therein being cylindrically curved about a diameter relatively slightly less than the diameter of said flange to provide support for said projecting ends of said arms correspondingly close to said flange, and gasket means carried by said screw for sealing against the bottom of said recess in the closed position of said assembly.

2. A filler cap assembly for the inlet of a container to retain positive pressure on the contents thereof, comprising an adapter including an annular rim and a cylindrical flange extending from said rim and forming the inlet opening, a cover proportioned to seat on said rim, gasket means carried by said cover for sealing against said rim in the closed position of said cover, an insert member carried by said cover and receivable within said flange, a multi-armed leaf spring carried by said insert member and being in the unstressed condition thereof generally spherically bowed outwardly toward said cover, said insert member having radial slots therethrough receiving said spring arms therethrough in guided relation, said spring being proportioned in said unstressed condition to retain the ends of said arms within said slots and said inlet opening for free insertion of said insert member into said flange, an operating member extending through said cover, means connecting the inner end of said operating member with said spring to cause flattening of said spring upon inward movement of said operating member with resulting projection of said arms into overlapping and locked relation with said flange, the portions of said insert member having said slots therein being of relatively slightly less radial dimensions than said flange to provide support for said projecting ends of said arms correspondingly close to said flange, means for retaining said operating member in said inwardly moved position thereof, and gasket means for sealing the junction between said operating member and said cover in the closed position of said assembly.

References Cited in the file of this patent

UNITED STATES PATENTS

| | | |
|---|---|---|
| 620,588 | Hoppes | Mar. 7, 1899 |
| 670,335 | Tilden et al. | Mar. 9, 1901 |
| 682,045 | De Carlo | Sept. 3, 1901 |
| 1,015,907 | Ryder | Jan. 30, 1912 |
| 2,218,581 | Levan | Oct. 22, 1940 |
| 2,283,371 | Johnson | May 19, 1942 |
| 2,509,075 | Richeson | May 23, 1950 |

FOREIGN PATENTS

| | | |
|---|---|---|
| 14,008 | Great Britain | 1885 |
| 666,368 | Germany | Oct. 18, 1938 |
| 595,633 | Great Britain | Dec. 11, 1947 |